(12) United States Patent
Li et al.

(10) Patent No.: US 12,285,776 B2
(45) Date of Patent: Apr. 29, 2025

(54) GRAVURE COATING DEVICE FOR PREPARING LARGE-WIDTH ULTRATHIN METAL LITHIUM STRIP AND METHOD THEREFOR

(71) Applicant: BEIJING WELION NEW ENERGY TECHNOLOGY CO., LTD, Beijing (CN)

(72) Inventors: Wenjun Li, Beijing (CN); Yongwei Li, Beijing (CN); Baopeng Hou, Beijing (CN); Zepeng Ding, Beijing (CN); Danrong Li, Beijing (CN); Yafei He, Beijing (CN); Chao Li, Beijing (CN); Huigen Yu, Beijing (CN)

(73) Assignee: BEIJING WELION NEW ENERGY TECHNOLOGY CO., LTD., Beijing (CN)

( * ) Notice: Subject to any disclaimer, the term of this patent is extended or adjusted under 35 U.S.C. 154(b) by 462 days.

(21) Appl. No.: 17/637,266

(22) PCT Filed: Aug. 17, 2020

(86) PCT No.: PCT/CN2020/109438
§ 371 (c)(1),
(2) Date: Feb. 22, 2022

(87) PCT Pub. No.: WO2021/032035
PCT Pub. Date: Feb. 25, 2021

(65) Prior Publication Data
US 2022/0280966 A1 Sep. 8, 2022

(30) Foreign Application Priority Data
Aug. 20, 2019 (CN) .......................... 201910769329.7

(51) Int. Cl.
*B05C 9/14* (2006.01)
*B05C 1/00* (2006.01)
(Continued)

(52) U.S. Cl.
CPC ................ *B05C 1/12* (2013.01); *B05C 1/003* (2013.01); *B05C 1/0808* (2013.01);
(Continued)

(58) Field of Classification Search
USPC ........................................................ 118/60
See application file for complete search history.

(56) References Cited

U.S. PATENT DOCUMENTS 2,647,842 A * 8/1953 Griesheimer .......... D21H 25/08
427/364
3,349,749 A * 10/1967 Utschig .................... D21H 5/06
118/69
(Continued)

FOREIGN PATENT DOCUMENTS

| CN | 108336298 | 7/2018 |
|---|---|---|
| CN | 108541226 | 9/2018 |

(Continued)

OTHER PUBLICATIONS

Extended European Search Report issued Aug. 14, 2023 in corresponding European Patent Application No. 20854773.7.
(Continued)

*Primary Examiner* — Jethro M. Pence
(74) *Attorney, Agent, or Firm* — Wenderoth, Lind & Ponack, L.L.P.

(57) ABSTRACT

Provided are a gravure coating device for preparing a large-width ultrathin metal lithium strip and the preparation method, relating to the technical field of preparation of metal lithium materials. The device comprises: a lithium-melting tank (17), a micro-gravure roller (5), a unwinding device, a (Continued)

substrate back roller (7), a hot pressing device and a winding device; wherein the lower portion of the micro-gravure roller (5) is immersed into the liquid lithium in the lithium-melting tank (17); one side of the micro-gravure roller (5) is provided with a hot scraper (6), and the end portion of the hot scraper (6) is in contact with the surface of the micro-gravure roller (5); the substrate back roller (7) is arranged diagonally above the micro-gravure roller (5); the unwinding device is arranged on one side of the substrate back roller (7); the winding device is arranged above the substrate back roller (7); the hot pressing device is arranged between the substrate back roller (7) and the winding device; after passing through the substrate back roller (7) and the hot pressing device, the substrate on the unwinding device is winded onto the winding device. The device is simple in structure and reasonable in design, effectively improves the coating uniformity, and realizes automatic production of ultrathin metal lithium strips with a thickness of 1-50 μm, thereby greatly improving work efficiency and product quality.

9 Claims, 1 Drawing Sheet

(51) Int. Cl.
*B05C 1/08* (2006.01)
*B05C 1/12* (2006.01)
*B05C 11/02* (2006.01)
*B05C 13/02* (2006.01)

(52) U.S. Cl.
CPC .......... *B05C 1/0817* (2013.01); *B05C 1/0865* (2013.01); *B05C 9/14* (2013.01); *B05C 11/025* (2013.01); *B05C 13/02* (2013.01)

(56) References Cited

U.S. PATENT DOCUMENTS

| | | | | |
|---|---|---|---|---|
| 3,762,365 A * | 10/1973 | Herzog | ................ | B05C 1/0808 |
| | | | | 118/259 |
| 3,788,271 A * | 1/1974 | Carpenter | ............... | B05C 1/003 |
| | | | | 118/235 |
| 4,883,691 A * | 11/1989 | McIntyre | ................ | B05C 5/001 |
| | | | | 427/256 |
| 4,911,995 A | 3/1990 | Bélanger et al. | | |
| 7,354,478 B2 * | 4/2008 | Yang | ......................... | B32B 5/08 |
| | | | | 156/499 |
| 10,525,501 B2 * | 1/2020 | Hidaka | ....................... | C09J 5/00 |
| 11,597,989 B2 * | 3/2023 | Frey | .................... | H01M 4/0485 |
| 2017/0253768 A1 | 9/2017 | Kappeler | | |
| 2018/0159114 A1 * | 6/2018 | Tanihara | ................ | H01M 4/139 |
| 2019/0001652 A1 * | 1/2019 | Mizo | ........................ | C22C 47/06 |
| 2019/0099775 A1 | 4/2019 | Sakamoto et al. | | |
| 2022/0087874 A1 * | 3/2022 | Schneider | ......... | A61F 13/49061 |

FOREIGN PATENT DOCUMENTS

| | | | | |
|---|---|---|---|---|
| CN | 108541226 A | * | 9/2018 | ............. B05B 15/50 |
| CN | 207823307 | | 9/2018 | |
| CN | 108906475 | | 11/2018 | |
| CN | 109346664 | | 2/2019 | |
| CN | 109360943 | | 2/2019 | |
| CN | 109778135 | | 5/2019 | |
| CN | 109778135 A | * | 5/2019 | |
| CN | 210614173 | | 5/2020 | |
| EP | 3 240 066 | | 11/2017 | |
| JP | 2011-089160 | | 5/2011 | |
| KR | 10-1320895 | | 10/2013 | |
| KR | 10-2097767 | | 4/2020 | |

OTHER PUBLICATIONS

International Search Report issued Nov. 24, 2020, in International (PCT) Application No. PCT/CN2020/109438, with English translation.

* cited by examiner

GRAVURE COATING DEVICE FOR PREPARING LARGE-WIDTH ULTRATHIN METAL LITHIUM STRIP AND METHOD THEREFOR

TECHNICAL FIELD

The invention relates to the technical field of metal lithium material preparation, in particular to a gravure coating device for preparing a large-width ultrathin metal lithium strip and the preparation method.

BACKGROUND ART

With the rapid development of new energy vehicles and aviation drones, metal lithium has emerged as a high energy density material. At present, when metal lithium is used as the negative electrode material to match the positive electrode material, the energy density of the lithium battery cannot be improved due to the high lithium content, thus the ultrathin lithium negative electrode has become a trend for improving its energy density.

Currently, the mass-produced lithium strip has a small width, and a relatively complex process of production; it is also relatively thicker with a thickness of more than 50 μm, and the uniformity of its surface thickness is poor. China Energy Lithium Co., Ltd. (Tianjin) has made a lithium strip with the effective thickness of 10-20 μm, but surface lubricant is needed to add for assistance in the production process of the lithium strip, and the resulting metal lithium strip has a layer of film on the surface, since the lubricant is expensive and affects the performance of the metal lithium, such a product cannot meet the industrial requirements and operational performance of ultrathin metal lithium. In the prior art, there are also some processes to obtain ultrathin lithium strips by melting the lithium ingot followed by rolling after tape casting or immersion plating or vapor deposition; such similar methods are complicated to control during the operation and have high requirements for operation, and the final rolling process is substantively indistinguishable from the production of traditional metal lithium strips, and the innovation is poor. Another process is to melt the lithium and then extrude and spray the molten lithium onto the substrate through argon gas or an extrusion device, and an ultrathin metal lithium strip is obtained by controlling the extrusion speed and the moving speed of the substrate; this method has high requirements for debugging the matching between the extrusion speed and the moving speed of the substrate, the debugging is difficult and the cost is high. In addition, it is reported that metal lithium is made into powder for spraying, due to the strong activity of lithium, its powder state is easy to react and explode, thus it is dangerous for this method and the possibility of industrial production is low.

CONTENTS OF THE INVENTION

In order to overcome the deficiencies of the prior art, the object of the present invention is to provide a gravure coating device for preparing a large-width ultrathin metal lithium strip and the preparation method. The gravure coating device is simple in structure and reasonable in design, effectively improves the coating uniformity, and realizes automatic and continuous production of metal lithium strips, thereby greatly improving work efficiency and product quality, and effectively solving the problems of difficult preparation, high cost and poor quality of ultrathin metal lithium strips in the prior art.

For solving the above problems, the technical scheme adopted in the present invention is as follows:

A gravure coating device for preparing a large-width ultrathin metal lithium strip, which comprises: a lithium-melting tank, a micro-gravure roller, a unwinding device, a substrate back roller, a hot pressing device and a winding device; wherein the lower portion of the micro-gravure roller is immersed in the liquid lithium in the lithium-melting tank for transferring the liquid lithium in the lithium-melting tank to the substrate; one side of the micro-gravure roller is provided with a hot scraper for removing liquid lithium, and the end portion of the hot scraper is in contact with the roller surface of the micro-gravure roller; the substrate back roller is arranged diagonally above the micro-gravure roller; the unwinding device is arranged on one side of the substrate back roller, the winding device is arranged above the substrate back roller, the hot pressing device is arranged between the substrate back roller and the winding device; after passing through the substrate back roller and the hot pressing device, the substrate on the unwinding device is winded onto the winding device.

As a preferred embodiment according to the present invention, the unwinding device comprises: an unwinding roller for winding the substrate to be treated, an unwinding correction controller, a unwinding tension-detecting roller and a first guide roller; wherein the unwinding correction controller is arranged between the unwinding tension-detecting roller and the unwinding roller; the first guide roller is arranged between the unwinding tension-detecting roller and the substrate back roller; after successively passing through the unwinding correction controller, the unwinding tension-detecting roller, the first guide roller, the substrate back roller and the hot pressing device, the substrate on the unwinding roller is winded onto the winding device.

As a preferred embodiment according to the present invention, the winding device comprises: a winding roller for winding the ultrathin metal lithium strip, a winding correction controller, a winding tension-detecting roller and a second guide roller; wherein the winding correction controller is arranged between the winding tension-detecting roller and the winding roller; the second guide roller is arranged between the winding tension-detecting roller and the hot pressing device; after successively passing through the winding tension-detecting roller and the winding correction controller, the ultrathin metal lithium strip obtained by combination is winded onto the winding roller.

As a preferred embodiment according to the present invention, the hot pressing device comprises: a hot pressing upper roller and a hot pressing lower roller; wherein the hot pressing upper roller and the hot pressing lower roller are arranged in parallel up and down.

As a preferred embodiment according to the present invention, the device of the present invention further comprises: a pre-shaping device and a third guide roller; wherein the third guide roller and the pre-shaping device are successively arranged between the substrate back roller and the hot pressing device, the pre-shaping device comprises a pre-shaping upper roller and a pre-shaping lower roller, the pre-shaping upper roller and the pre-shaping lower roller are arranged in parallel up and down.

As a preferred embodiment according to the present invention, the device of the present invention further comprises: a sealed working chamber and an inert gas supply device for providing an inert gas to the sealed working chamber; wherein the lithium-melting tank, the micro-gravure roller, the unwinding device, the substrate back roller, the winding device, the hot pressing device and the inert gas supply device are all arranged in the sealed working chamber; wherein the inert gas supplied by the inert gas supply device is argon.

As a preferred embodiment according to the present invention, a heating device is respectively arranged in the lithium-melting tank, the micro-gravure roller and the hot scraper; wherein the lithium-melting tank, the micro-gravure roller and the hot scraper are all made of copper, and the inner surface of the lithium-melting tank, the outer surfaces of the micro-gravure roller and the hot scraper are all plated with stainless steel films.

As a preferred embodiment according to the present invention, the substrate back roller is made of high temperature resistant rubber.

The present invention also provides a method for preparing a large-width ultrathin metal lithium strip, wherein the above-mentioned gravure coating device is used for preparation of the strip, and particularly the method comprises the following steps:
  a. making the substrate on the unwinding device successively pass through the substrate back roller and the hot pressing device to be winded onto the winding device, then making the substrate be tensioned;
  b. pre-heating the micro-gravure roller, the hot scraper and the hot pressing device, then heating the liquid lithium in the lithium-melting tank to 190-400° C. in inert gas to keep it in a molten state;
  c. starting the micro-gravure roller, unwinding roller and the winding roller, then adjusting the winding speed to make the substrate be tensioned and move forward to the direction of the winding roller, wherein during the moving process the liquid lithium on the micro-gravure roller is evenly combined on the surface of the substrate, and when the substrate passes through the hot pressing device, the liquid lithium on the substrate is evenly flattened on the surface of the substrate, then a ultrathin metal lithium strip coated with lithium on one side is obtained after winding.

As a preferred embodiment according to the present invention, the heating temperature of the micro-gravure roller and the hot scraper in step b is 190-230° C.; the heating temperature of the hot pressing device is 100-130° C.

Compared with the prior art, the beneficial effects of the present invention lie in that:

As for the gravure coating device for preparing a large-width ultrathin metal lithium strip and the preparation method according to the present invention, the molten liquid lithium is transferred to the surface of the substrate by using the grooves on the micro-gravure roller and adjusting the winding and unwinding speed, and then followed by the pre-shaping and hot pressing processes to obtain a uniform ultrathin metal lithium strip with a thickness of 1-50 µm; in addition, the gravure coating device according to the present invention is simple in structure and reasonable in design, thereby effectively improving the coating uniformity, and realizing automatic and continuous production of large-width ultrathin metal lithium strips. Compared with the extrusion method in the prior art, the method of this invention does not need a large pressure equipment to extrude lithium ingots, and there is less rigid function requirements for the equipment in the production process, so that the width of the produced lithium strips is not limited. Compared with the immersion plating method in the prior art, there is no need to melt a large amount of metal liquid lithium in advance, so as to avoid the phenomenon of catching fire caused by the accumulation of a large amount of liquid lithium due to the immersion of the substrate into the liquid lithium, thus this method has high safety; in addition, since there is no need to immerse the substrate in liquid lithium, the impact of high temperature on the substrate is effectively reduced. The invention effectively improves the coating uniformity by transferring the liquid lithium to the substrate via a micro-gravure roller, and greatly improves the work efficiency and product quality, thereby effectively solving the problems in production of the ultrathin metal lithium strip in the prior art such as the high cost, complicated production process, poor uniformity of the surface of the lithium strip, low production efficiency.

Figure 1:
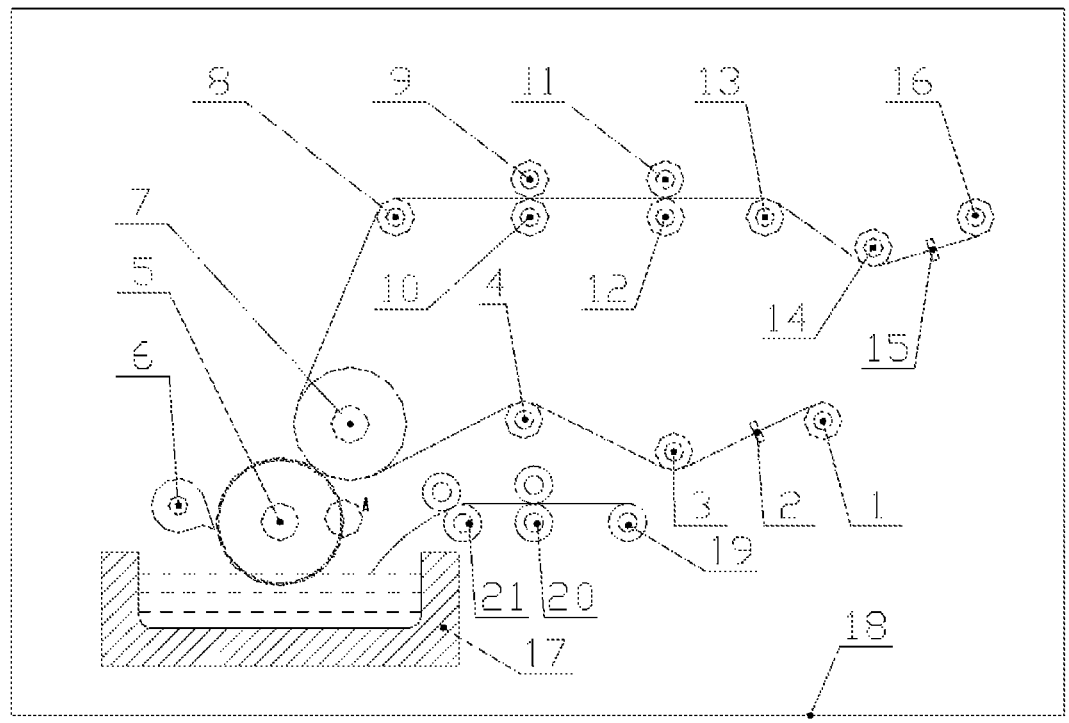
FIG. 1 is a schematic diagram of the structure of the gravure coating device for preparing a large-width ultrathin metal lithium strip according to the present invention.

Description of the reference numerals: 1. Unwinding roller; 2. Unwinding correction controller; 3. Unwinding tension-detecting roller; 4. First guide roller; 5. Micro-gravure roller; 6. Hot scraper; 7. Substrate back roller 8. Third guide roller; 9. Pre-shaping upper roller; 10. Pre-shaping lower roller; 11. Hot pressing upper roller; 12. Hot pressing lower roller; 13. Second guide roller; 14. Winding tension-detecting roller; 15. Winding correction controller; 16. Winding roller; 17. Lithium-melting tank; 18. Sealed working chamber; 19. Lithium material roller; 20. Feeding roller; 21. Fourth guide roller.

SPECIFIC EMBODIMENTS

The present invention will be further described in detail below with reference to the accompanying drawings and specific embodiments.

Referring to FIG. 1, the gravure coating device for preparing a large-width ultrathin metal lithium strip according to the present invention comprises: a lithium-melting tank 17 for melting metal lithium ingots, a micro-gravure roller 5 for transferring liquid lithium to the surface of the substrate, a unwinding device for supplying the substrate, a substrate back roller 7 for cooperating with the micro-gravure roller 5, a hot pressing device for flattening the liquid lithium on the substrate evenly, and a winding device for winding the ultrathin metal lithium strip.

Figure 2:
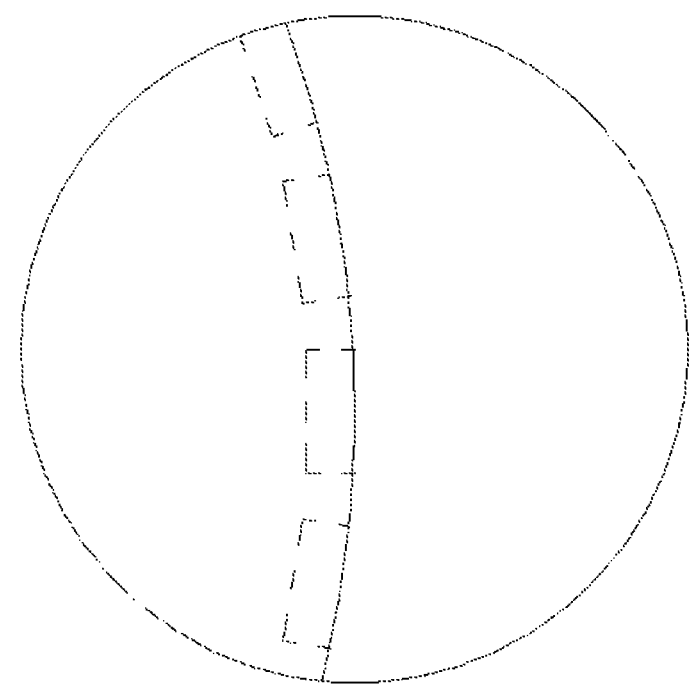
FIG. 2 is a schematic diagram of enlarged part A in FIG. 1 of the present invention.

Particularly, a heating device is provided inside the lithium-melting tank 17 for melting the metal lithium ingots. Preferably, the lithium-melting tank 17 is made of copper, and its inner surface is plated with a stainless steel film which may effectively ensure the stability for the molten state of the metal liquid lithium, the uniformity of heat distribution, and the instantaneousness of heat conduction. Referring to FIG. 2, the roller surface of the micro-gravure roller 5 is evenly provided with a plurality of grooves arranged axially parallel with the micro-gravure roller 5, and the grooves are arranged at intervals for containing liquid lithium so as to transfer it to the surface of the substrate; preferably, the cross-section of the grooves is rectangular or semicircular. The lower portion of the micro-gravure roller 5 is immersed in the liquid lithium in the lithium-melting tank 17 for transferring the liquid lithium in the lithium-melting tank 17 to the surface of the substrate. One side of the micro-gravure roller 5 is provided with a hot scraper 6 for removing the liquid lithium on the roller surface of the micro-gravure roller 5. The end of the hot scraper 6 is in close contact with the roller surface of the micro-gravure roller 5, but they do not interfere with each other, thereby facilitating to scrape off all the excess liquid lithium on the roller surface of the micro-gravure roller 5. Due to the small amount of liquid lithium on the micro-gravure roller 5 and the hot scraper 6, it is easy to cause the liquid lithium to solidify on the micro-gravure roller 5 and the hot scraper 6; a heating device is respectively provided inside the micro-gravure roller 5 and the hot scraper 6, and the liquid lithium on the micro-gravure roller 5 and the hot scraper 6 may always be kept in a molten state and have a certain viscosity by heating the micro-gravure roller 5 and the hot scraper 6. Similarly, the micro-gravure roller 5 and the hot scraper 6 are both made of copper, and the outer surfaces of the micro-gravure roller 5 and the hot scraper 6 are plated with stainless steel films to ensure the stability for the molten state of the metal lithium, the uniformity of heat distribution, and the instantaneousness of heat conduction. The substrate back roller 7 is arranged diagonally above the micro-gravure roller 5, and the roller surface of the substrate back roller 7 is attached to the roller surface of the micro-gravure roller 5 during production; preferably, the substrate back roller 7 is made of high temperature resistant rubber so that the micro-gravure roller 5 may slightly deform the substrate back roll 7 during production, thereby ensuring that the liquid lithium in the grooves on the micro-gravure roller 5 is completely transferred to the surface of the substrate. The unwinding device is arranged on one side of the substrate back roller 7, the winding device is arranged above the substrate back roller 7, the hot pressing device is arranged between the substrate back roller 7 and the winding device; after passing through the substrate back roller 7 and the hot pressing device, the substrate on the unwinding device is winded onto the winding device. It can be seen from the above embodiment that, in the present invention the preparation of a ultrathin metal lithium strip is completed by transferring the liquid lithium in the lithium-melting tank 17 to the surface of the substrate by using the grooves on the micro-gravure roller 5, then removing the excess liquid lithium on the roller surface of the micro-gravure roller 5 by the hot scraper 6, followed by flattening the liquid lithium on the substrate evenly with a hot pressing device; this method has fewer processes and simple operation, thereby realizing automatic and continuous production, and facilitating to reducing production cost.

More particularly, the unwinding device comprises: an unwinding roller 1 for winding the substrate to be treated, an unwinding correction controller 2, an unwinding tension-detecting roller 3 and a first guide roller 4; wherein the unwinding correction controller 2 is arranged between the unwinding tension-detecting roller 3 and the unwinding roller 1; the first guide roller 4 is arranged between the unwinding tension-detecting roller 3 and the substrate back roller 7; after successively passing through the unwinding correction controller 2, the unwinding tension-detecting roller 3, the first guide roller 4 and the substrate back roll 7, the substrate on the unwinding roller 1 is winded onto the winding device. Herein, the above-mentioned substrate is an oxidation-resistant and reusable foil that has a certain affinity with metal lithium and does not react with metal lithium, including but not limited to: stainless steel foil, copper foil, steel foil, iron foil and other materials. Similarly, the winding device comprises: a winding roller 16 for winding the ultrathin metal lithium strip, a winding correction controller 15, a winding tension-detecting roller 14 and a second guide roller 13; wherein the winding correction controller 15 is arranged between the winding tension-detecting roller 14 and the winding roller 16; the second guide roller 13 is arranged between the winding tension-detecting roller 14 and the hot pressing device; after successively passing through the hot pressing device, the second guiding roller 13, the winding tension-detecting roller 14 and the winding correction controller 15, the ultrathin metal lithium strip obtained by combination is winded onto the winding roller 16.

Particularly, the hot pressing device comprises: a hot pressing upper roller 11 and a hot pressing lower roller 12, wherein the hot pressing upper roller 11 and the hot pressing lower roller 12 are arranged in parallel up and down, there is a gap between the hot pressing upper roller 11 and the hot pressing lower roller 12, and the width of the gap is equal to the sum of the thickness of the substrate and the thickness of the expected coating. A heating device is respectively provided inside the hot pressing upper roller 11 and the hot pressing lower roller 12; by heating the hot pressing upper roller 11 and the hot pressing lower roller 12, the liquid lithium on the surface of the substrate may be effectively prevented from being cooled and solidified to cause it unable to be flattened evenly, thereby ensuring that the liquid lithium of the substrate remains in a molten state and is evenly and flatly combined onto the surface of the substrate. Further, in order to prevent the liquid lithium from adhering to the hot pressing upper roller 11 and the hot pressing lower roller 12, the surfaces of the hot pressing upper roller 11 and the hot pressing lower roller 12 may be subjected to special surface coating treatment, for example, the surfaces of the upper roller 11 and the hot pressing lower roller 12 may be plated with copper, nickel, and aluminum oxide, etc., but not limited to the above materials, thereby ensuring that the liquid lithium will not pollute the hot pressing upper roller 11 and the hot pressing lower roller 12, and the waste of lithium material is avoided to facilitate to reduce production cost.

Since the micro-gravure roller 5 will extrude the substrate back roller 7 during the production process, it is easy to cause the substrate on the substrate back roller 7 to be creased or uneven due to the extrusion of the grooves. In order to avoid the slight deformation of the substrate to affect the performance of the lithium strip, the device of the present invention also comprises: a pre-shaping device for shaping the substrate and a third guide roller 8 for tensioning the substrate; wherein the third guide roller 8 and the pre-shaping device are successively arranged between the substrate back roller 7 and the hot pressing device. Through the cooperation of the third guide roller 8 and the pre-shaping device, the slightly deformed substrate may be pre-shaped to keep the substrate flat, thereby facilitating the subsequent hot pressing process to carry out. Particularly, the pre-shaping device comprises: a relatively rotatable pre-shaping upper roller 9 and a pre-shaping lower roller 10; wherein the pre-shaping upper roller 9 and the pre-shaping lower roller 10 are arranged in parallel up and down, and there is a gap between the pre-shaping upper roller 9 and the pre-shaping lower roller 10 for the substrate to pass through.

The preparation device of the present invention further comprises: a sealed working chamber 18 and an inert gas supply device for supplying an inert gas to the sealed working chamber 18; wherein the lithium-melting tank 17, the micro-gravure roller 5, the unwinding device, the substrate back roll 7, the heat pressing device, the pre-shaping device, the winding device and the inert gas supply device are arranged in the sealed working chamber 18, so as to ensure the liquid lithium not to be oxidized and ensure the safety of the liquid lithium. Preferably, the inert gas supplied by the inert gas supply device is argon. The present invention also comprises a feeding device for conveying lithium material to the lithium-melting tank 17, wherein the feeding device comprises: a lithium material roller 19, two feeding rollers 20 and two fourth guide rollers 21 which are arranged in sequence; wherein after successively passing through the gaps between the two feeding rollers 20 and the two fourth guide rollers 21, the lithium material strip on the lithium material roller 19 extends into the lithium-melting tank 17, and the lithium material strip (may also be a lithium rod) is continuously transported into the lithium-melting tank 17 via the transmission of the feeding roller 20.

The working process of the above-mentioned preparation device is as follows: firstly the substrate is made to pass through the gap between the unwinding roller 1, the unwinding correction controller 2, the unwinding tension-detecting roller 3, the guide roller, the micro-gravure roller 5 and the substrate back roller 7 respectively; and then pass through the third guide roller 8, the pre-shaping device, the hot pressing device, the winding tension-detecting roller 14, the winding correction controller 15 and the winding roller 16; after finishing the threading of the substrate, firstly the distance between the hot scraper 6 and the micro-gravure roller 5 is adjusted, so that the end portion of the hot scraper 6 is in contact with the roller surface of the micro-gravure roller 5 but they do not interfere with each other, so as to scrape off the excess liquid lithium on the roller surface of the micro-gravure roller 5; and then the roller gap distance between the substrate back roller 7 and the micro-gravure roller 5 is adjusted to make the micro-gravure roller 5 extrude the substrate back roller 7, so that the substrate back roller 7 is slightly deformed to ensure that the liquid lithium inside the groove of the micro-gravure roller 5 may be completely transferred to the surface of the substrate; then the lithium-melting tank 17 is heated to 190-400° C. to melt the lithium ingots and ensure the molten state of the metal liquid lithium and the viscosity of the liquid lithium, the micro-gravure roller 5 and the hot scraper 6 are heated to 190-230° C., and the hot pressing device is heated to 100-130° C.; then the micro-gravure roller 5 is started to continuously dip in the liquid lithium and transfer the liquid lithium in the groove to the surface of the substrate; after cooling, the substrate coated with liquid metal lithium is shaped in advance by a pre-shaping device to ensure the flatness of the substrate, and then hot-pressed by a hot pressing device, so that the liquid lithium on the substrate is flattened evenly and smoothly; meanwhile the winding roller 16 is started and its winding speed is continuously adjusted, thereby obtaining an ultrathin metal lithium strip.

The present invention also provides a method for preparing a large-width ultrathin metal lithium strip, the preparation is carried out by using the above-mentioned gravure coating device, mainly the substrate is made to pass through the gap between the micro-gravure roller 5 and the substrate back roller 7, then the excess liquid lithium on the roller surface of the micro-gravure roller 5 is removed by the hot scraper 6, and then the liquid lithium on the substrate is flattened evenly by the pre-shaping and hot pressing processes, finally an ultrathin metal lithium strip is obtained after natural cooling. Particularly, the method comprises the following steps:

a. making the substrate on the unwinding device successively pass through the substrate back roller 7 and the hot pressing device to be winded onto the winding device, then making the substrate be tensioned;

b. pre-heating the micro-gravure roller 5 and the hot scraper 6 to 190-230° C. to ensure that the liquid lithium on the micro-gravure roller 5 and the hot scraper 6 remains in a molten state and has a certain viscosity; preheating the hot pressing device to 100-130° C., so that it may flatten the liquid lithium on the substrate evenly and smoothly; then heating the liquid lithium in the lithium-melting tank 17 to 190-400° C. in inert gas to keep it in a molten state;

c. starting the micro-gravure roller 5, unwinding roller 1 and the winding roller 16, then adjusting the winding speed to make the substrate be tensioned and move forward to the direction of the winding roller 16, wherein during the moving process the liquid lithium on the micro-gravure roller 5 is evenly combined on the surface of the substrate, and when the substrate passes through the hot pressing device, the liquid lithium on the substrate is evenly flattened on the surface of the substrate, then a ultrathin metal lithium strip coated with lithium on one side is obtained after winding.

It can be seen that, as for the gravure coating device for preparing a large-width ultrathin metal lithium strip and the preparation method according to the present invention, the molten liquid lithium is transferred to the surface of the substrate by using the grooves on the micro-gravure roller 5 and adjusting the winding and unwinding speed, and then followed by the pre-shaping and hot pressing processes to obtain a uniform ultrathin metal lithium strip with a thickness of 1-50 μm. The method of the invention has fewer processes and simple operation, effectively improves the coating uniformity, and enables automatic and continuous production of a large-width ultrathin metal lithium strip, thereby greatly improving work efficiency and product quality.

The above-mentioned embodiments are only preferred embodiments of the present invention, and cannot be used to limit the protection scope of the present invention. Any insubstantial changes and substitutions made by those skilled in the art on the basis of the present invention belong to the protection scope of the present invention.

The invention claimed is:

1. A gravure coating device for preparing a metal lithium strip, comprising: a lithium-melting tank, a micro-gravure roller, a unwinding device, a substrate back roller, a hot pressing device, a winding device, a pre-shaping device and a third guide roller;

wherein:

a lower portion of the micro-gravure roller is immersed in a liquid lithium in the lithium-melting tank for transferring the liquid lithium in the lithium-melting tank to a substrate;

one side of the micro-gravure roller is provided with a hot scraper for removing the liquid lithium, and an end portion of the hot scraper is in contact with a roller surface of the micro-gravure roller;

the substrate back roller is arranged diagonally above the micro-gravure roller;

the unwinding device is arranged on one side of the substrate back roller, the winding device is arranged above the substrate back roller, the hot pressing device is arranged between the substrate back roller and the winding device;

after passing through the substrate back roller and the hot pressing device, the substrate on the unwinding device is winded onto the winding device;

the third guide roller and the pre-shaping device are successively arranged between the substrate back roller and the hot pressing device, the pre-shaping device comprises a pre-shaping upper roller and a pre-shaping lower roller, and the pre-shaping upper roller and the pre-shaping lower roller are arranged in parallel up and down.

2. The gravure coating device according to claim 1, wherein the unwinding device comprises: an unwinding roller for winding the substrate to be treated, an unwinding correction controller, a unwinding tension-detecting roller and a first guide roller; wherein the unwinding correction controller is arranged between the unwinding tension-detecting roller and the unwinding roller; the first guide roller is arranged between the unwinding tension-detecting roller and the substrate back roller; after successively passing through the unwinding correction controller, the unwinding tension-detecting roller, the first guide roller, the substrate back roller and the hot pressing device, the substrate on the unwinding roller is winded onto the winding device.

3. The gravure coating device according to claim 1, wherein the winding device comprises: a winding roller for winding the metal lithium strip, a winding correction controller, a winding tension-detecting roller and a second guide roller; wherein the winding correction controller is arranged between the winding tension-detecting roller and the winding roller; the second guide roller is arranged between the winding tension-detecting roller and the hot pressing device; after successively passing through the winding tension-detecting roller and the winding correction controller, the metal lithium strip obtained by combination is winded onto the winding roller.

4. The gravure coating device according to claim 1, wherein the hot pressing device comprises: a hot pressing upper roller and a hot pressing lower roller; wherein the hot pressing upper roller and the hot pressing lower roller are arranged in parallel up and down.

5. The gravure coating device according to claim 1, further comprising: a sealed working chamber and an inert gas supply device for providing an inert gas to the sealed working chamber; wherein the lithium-melting tank, the micro-gravure roller, the unwinding device, the substrate back roller, the winding device, the hot pressing device and the inert gas supply device are all arranged in the sealed working chamber.

6. The gravure coating device according to claim 1, wherein a heating device is respectively arranged in the lithium-melting tank, the micro-gravure roller and the hot scraper; wherein the lithium-melting tank, the micro-gravure roller and the hot scraper are all made of copper, and an inner surface of the lithium-melting tank, and outer surfaces of the micro-gravure roller and the hot scraper are all plated with stainless steel films.

7. The gravure coating device according to claim 1, wherein the substrate back roller is made of high temperature resistant rubber.

8. A method for preparing a metal lithium strip, using the gravure coating device according to claim 1 and comprising the following steps:
   a. making the substrate on the unwinding device successively pass through the substrate back roller, the third guide roller, the pre-shaping device and the hot pressing device to be winded onto the winding device, then making the substrate be tensioned;
   b. pre-heating the micro-gravure roller, the hot scraper and the hot pressing device, then heating the liquid lithium in the lithium-melting tank to 190-400° C. in inert gas to keep it in a molten state;
   c. starting the micro-gravure roller, unwinding roller and the winding roller, then adjusting the winding speed to make the substrate be tensioned and move forward to a direction of the winding roller,
      wherein during the moving process the liquid lithium on the micro-gravure roller is evenly combined on a surface of the substrate, and when the substrate passes through the hot pressing device, the liquid lithium on the substrate is evenly flattened on the surface of the substrate, then a metal lithium strip coated with lithium on one side is obtained after winding.

9. The method according to claim 8, wherein a heating temperature of the micro-gravure roller and the hot scraper in step b is 190-230° ° C.; and a heating temperature of the hot pressing device is 100-130° C.

* * * * *